Sept. 15, 1970    E. C. McGEE    3,528,157
PRESS TOOLS
Filed Aug. 21, 1967    3 Sheets-Sheet 2
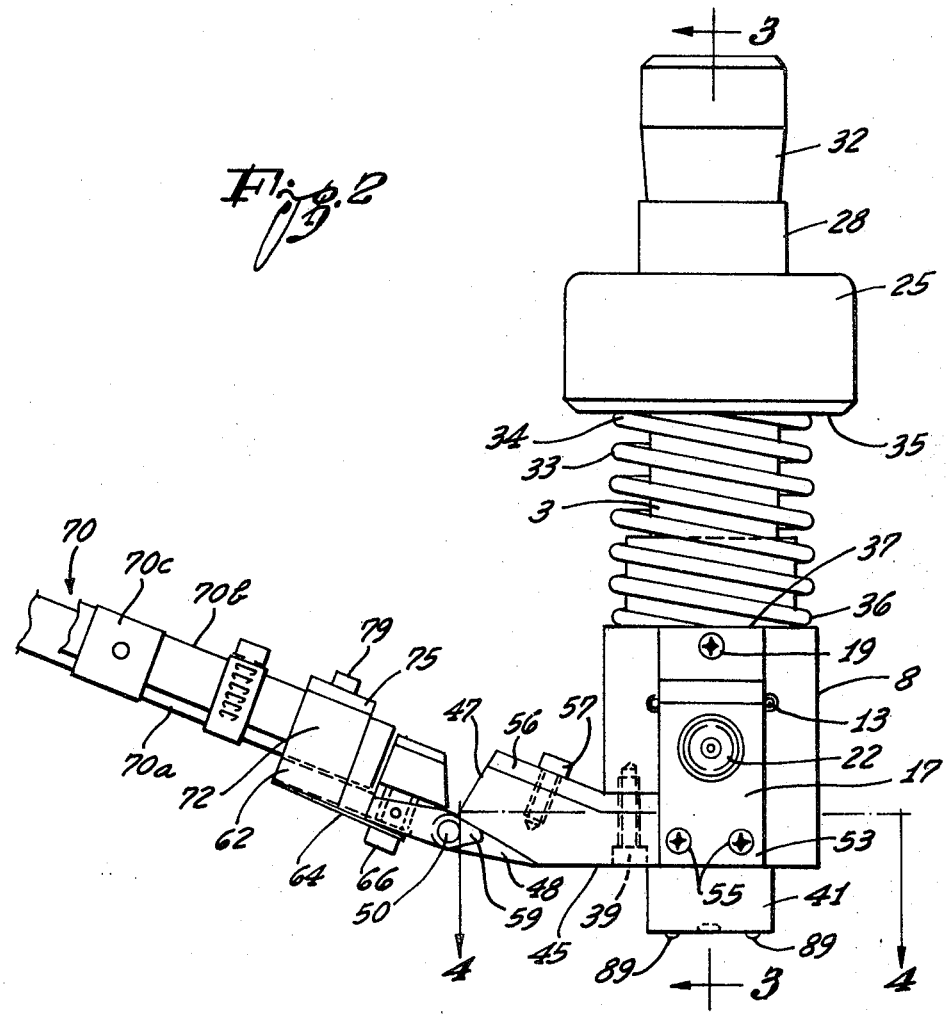
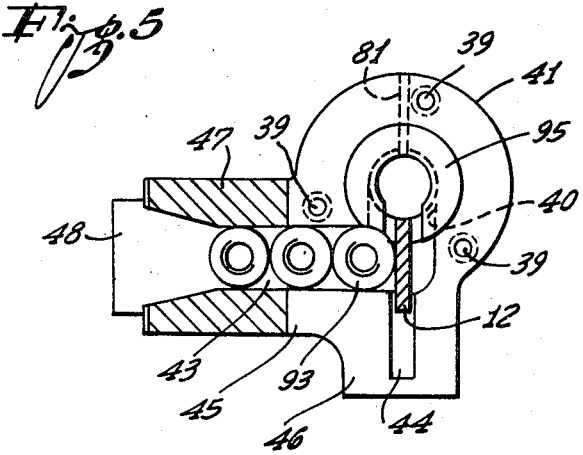
INVENTOR:
Charles Edward McGee
By Alan C. Rose
ATTORNEY Sept. 15, 1970   E. C. McGEE   3,528,157
PRESS TOOLS Filed Aug. 21, 1967   3 Sheets-Sheet 3

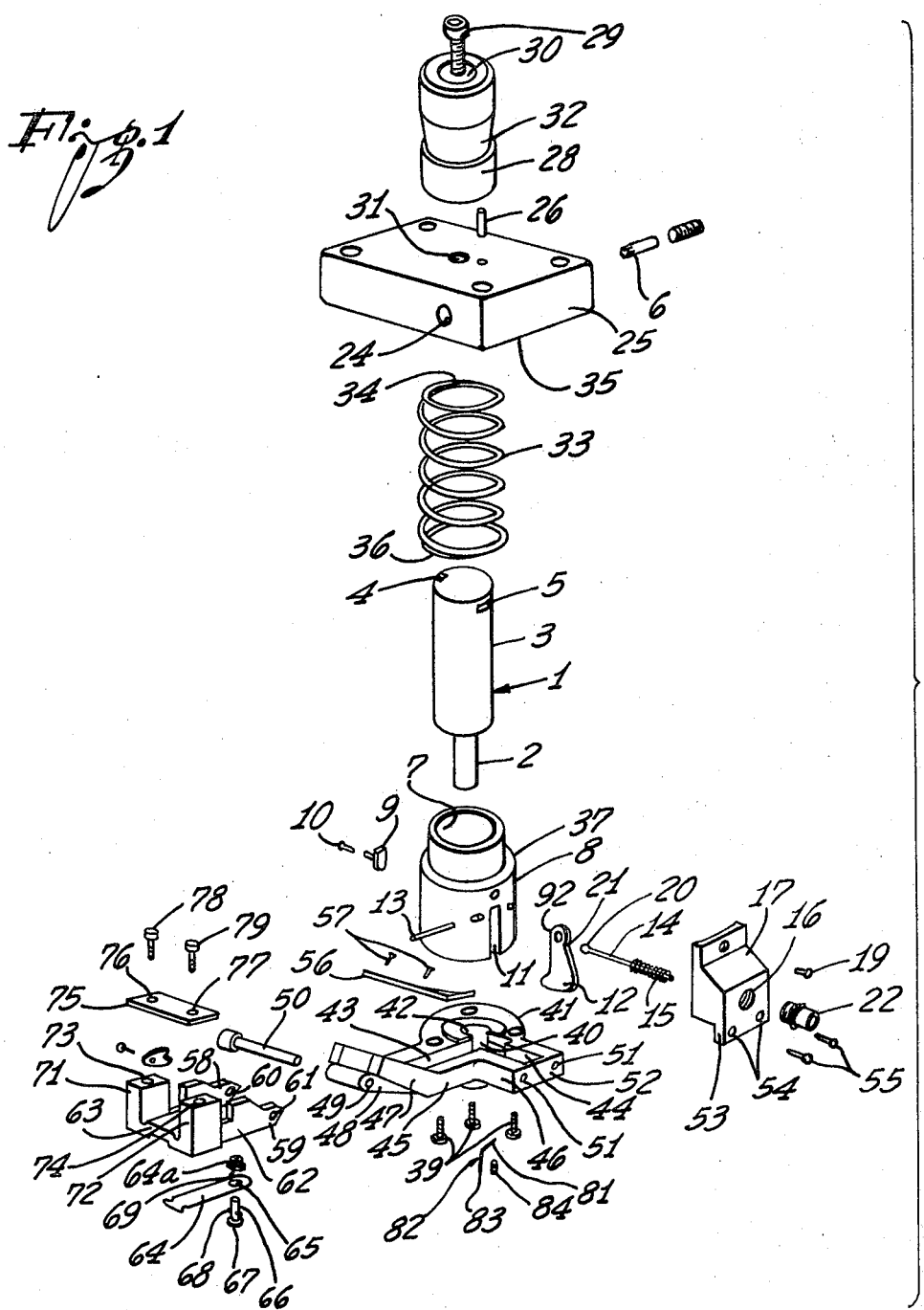

INVENTOR:
Charles Edward McGee

By Alan C. Rose
ATTORNEY

United States Patent Office 3,528,157
Patented Sept. 15, 1970

3,528,157
PRESS TOOLS
Edward Charles McGee, Bishops Stortford, England, assignor to Litton Precision Products, Inc., Beverly Hills, Calif., a corporation of Delaware
Filed Aug. 21, 1967, Ser. No. 662,014
Claims priority, application Great Britain, Aug. 24, 1966, 37,892/66
Int. Cl. B23p 19/04; B23q 7/10; B22p 11/00
U.S. Cl. 29—200                                        10 Claims

ABSTRACT OF THE DISCLOSURE

An apparatus for punching inserts into sheet material. The inserts may be punched into holes previously formed in the material, or the inserts may be of the self-punching type. This apparatus may be attached to a pressure-applying member of a press, e.g., the ram of a reciprocating ram type press. A feeding mechanism is provided to facilitate the punching of a succession of inserts.

---

This invention relates to a press tool for use in punching operations, for example, punching inserts such as bushes, studs or rivets into sheet material. The inserts may be punched into holes previously formed in the sheet, or they may be self-piercing inserts. A self-piercing insert is one which can be punched into a sheet to form its own hole therein in co-operation with a die located on the opposite side of the sheet. Methods of securing an insert in a sheet in this manner are described and claimed in British patent specifications Nos. 776,373 and 869,037.

It is an object of the invention to provide a tool which can be fitted to the pressure-applying member of a press, for example, the ram of a press of the reciprocating ram type, and which is operable to punch a succession of articles.

According to the present invention there is provided a press tool for use in punching of articles, comprising a punch reciprocable in a bore in a housing, a feed aperture in the wall of said bore through which an article to be punched can be fed into the bore, means for conducting to the feed aperture a succession of articles to be punched, and a feed member movable away from and towards the feed aperture for feeding the leading article of the succession through the aperture into the bore, the feed member being arranged normally to hold back the leading article and, when moved away from the feed aperture, to release the leading article for movement into the path of movement of the feed member towards the feed aperture, and the feed member being arranged to be moved away from the feed aperture by the punch during the operative stroke thereof, and return means being provided for moving the feed member towards the feed aperture during the return stroke of the punch so as to feed the leading article through the feed aperture into the bore in the housing.

Figure 3:
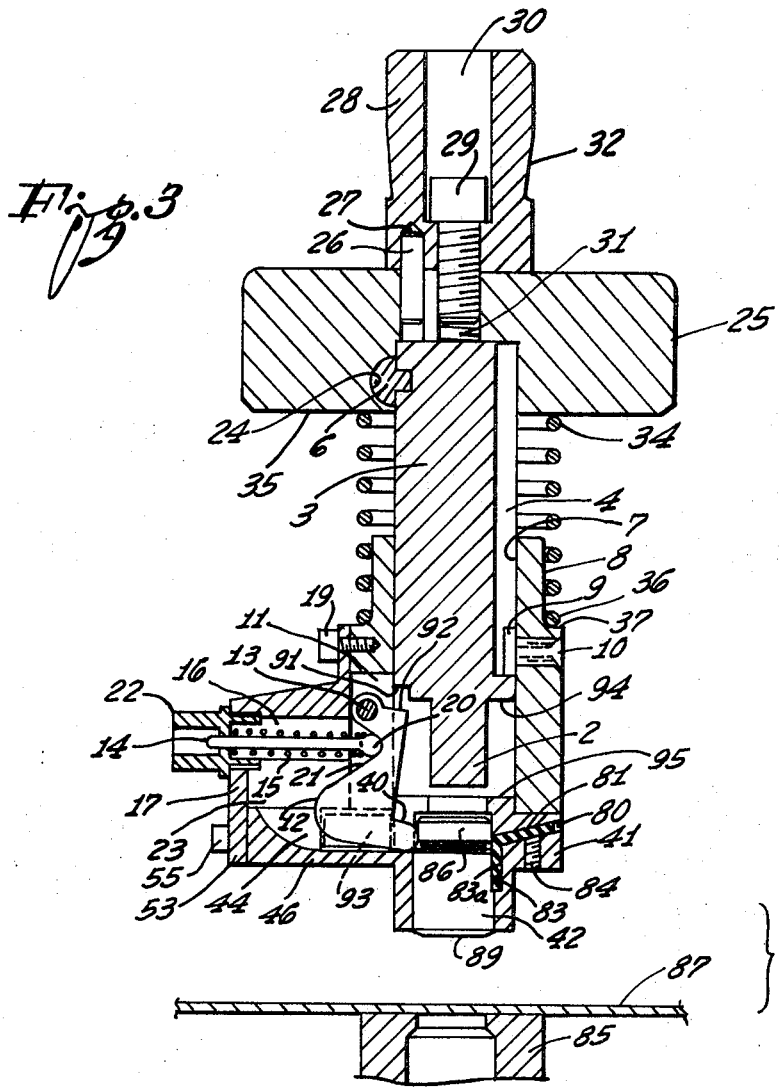
Figure 4:
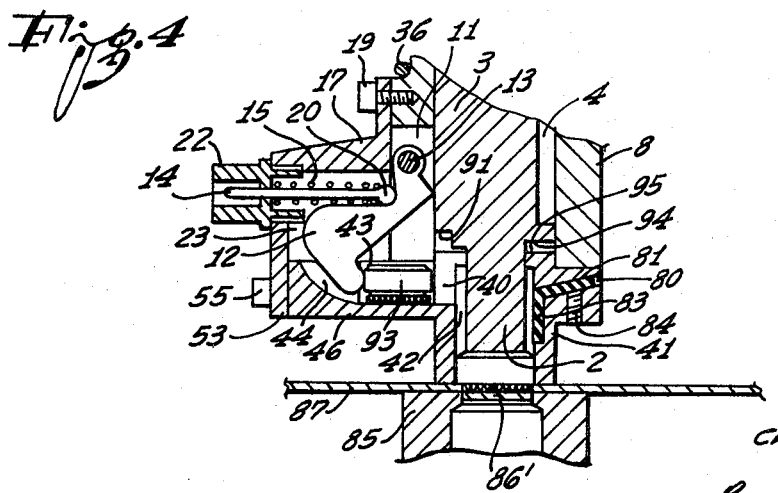

In order that the invention may be readily carried into effect, reference will now be made to the accompanying drawings, in which:

FIG. 1 is an exploded perspective view of a press tool according to the invention for use in punching inserts into sheet material, FIG. 2 is a side elevation of the assembled tool of FIG. 1 with an insert supply means attached, FIG. 3 is a sectional elevation taken on the line III—III of FIG. 2, FIG. 4 is a sectional view of the lower part of the tool, also taken on line III—III of FIG. 2, illustrating the operation of the tool, and FIG. 5 is a sectional plan view taken on the line V—V of FIG. 2.

The press tool shown in the drawings comprises a cylindrical punch 1 having a main body portion 3 and a punching section 2 of reduced diameter. The punch body 3 is formed with a longitudinal groove 4 to receive a key 9 and a lateral groove 5 for a cotter pin 6. The punch body has a sliding fit in the bore 7 of a cylindrical punch housing 8. The punch is prevented from rotating in the housing 8 by the key 9, which engages slidably in the groove 4 in the punch body and is secured in the wall of the punch housing by a screw 10. The punch housing is formed with a longitudinal slot 11 extending from the lower end thereof. A pawl 12 is supported in this slot so as to be movable pivotally through the slot, the pawl pivoting on a horizontal shaft 13 journalled in the wall of the punch housing. The pawl is urged inwardly through the slot 11 by a pin 14 loaded by a helical spring 15. This spring is located in a horizontal bore 16 in a block 17 secured to the outside of the punch housing by a screw 19. The spring is held in compression between a head 20 on the pin 14, which head is seated in a recess 21 in the pawl 12, and a cap 22 which screws into the outer end of the bore 16. The block 17 fits on the punch housing so as to cover the slot 11 therein and is formed with a recess 23 (FIG. 3) into and out of which the pawl 12 can swing.

The cotter pin 6 fits into bore 24 in a pressing block 25. The upper face of this block carries a peg 26 which fits into a blind bore 27 (FIG. 3) in a head stock 28 of the tool. The head stock 28 is secured to the block 25 by a screw 29 which is passed down a bore 30 in the head stock and screwed into a tapped hole 31 in the block 25. The head stock has an external chamfer at 32 to enable the tool to be acted on by the ram of an automatic press. A helical spring 33 surrounds the punch 1. The upper end 34 of this spring bears against the underside 35 of the block 25 whilst the lower end 36 bears against an external shoulder 37 on the punch housing so as to urge the housing downwardly relative to the punch to the limit of the travel of the key 9 in the groove 4.

On the lower end of the punch housing 8 an annular housing extension 41 is secured by screws 39. The extension 41 has a bore 42 which is co-axial with the bore 7 in the housing 8. In the wall of the bore 42 at the lower end of the slot 11 in the housing 8 is an aperture 40 (FIGS. 3 to 5) through which inserts can be fed one at a time into the bore 42. Extending tangentially of the bore 42 and terminating at the feed aperture 40 is a feed channel 43 formed in an ear 45 on the housing extension 41. The ear 45 is formed with an upwardly inclined extension 47 and the channel 43 extends up this extension. The housing extension 41 has another ear 46 in which is formed a groove 44 which extends at right angles to the feed channel 43 and opens into this channel at a point directly opposite the feed aperture 40. The groove 44 is co-planar with the slot 11 in the punch housing 8 and accommodates movement of the foot of the pawl 12. Two threaded bores 51 are provided in the end face 52 of the ear 46 to receive screws 55 inserted through holes 54 in a downwardly projecting flange 53 on the block 17. A cover plate 56 (FIG. 2) is secured over the ear 45 and its extension 47 by means of screws 57.

On the underside of the extension 47 of the ear 45 is formed a hinge plate 48 having a bore 49 for a hinge pin 50. The sides of the hinge plate 48 are embraced by two lugs 58, 59 (FIGS. 1 and 2) formed with bores 60, 61 respectively to receive the hinge pin 50. The lugs 58, 59 are formed at one end of a channel member 62 to which is connected one end of a flexible chute or flight 70 (FIG. 2). The flight may be made of plastic, for example. The channel member 62 has a flat plate (not shown) with stakes thereon for biting into the bottom of the flight. The other end of the flight may be connected to any suitable insert feeder, for example, a vibrating-bowl feeder, into which a supply of inserts can be tipped and which will feed the inserts in succession down the flight. The hinged connection between the flight and the press tool enables the flight to follow the reciprocatory movements of the tool, the flight itself flexing as it follows these movements.

As shown in FIG. 2, on the underside of the bottom 63 of the channel member 62 is secured a leaf spring 64 with a free end on which a stop member 64a is mounted, the spring being so tensioned that it tends to lift the stop member through an opening (not shown) in the bottom of the channel member 62 into the path of the inserts travelling down the flight so as to hold back the inserts from the press tool should it be desired to detach the tool from the flight for any reason. The leaf spring has a hole 65 at its free end, through which hole passes a pin 66 notatably secured in the bottom 63 of the channel member 62. The pin 66 has a transverse bore 67 in which a cotter pin 68 is secured. This cotter pin is normally orientated so as to keep the free end of the leaf spring 64 depressed. The pin 66 can be rotated, however, to turn the cotter pin into alignment with a slot 69 in the stop member 64a so as to allow the leaf spring 64 to lift the stop member into the path of the inserts travelling down the flight 70.

The channel member 62 is formed at its end remote from the lugs 58, 59 with two upwardly projecting wall portions 71, 72 having threaded bores 73, 74 respectively in their upper faces. A cover plate 75 is secured on the wall portions 71, 72 by screws 78, 79 which pass through holes 76, 77 respectively in the cover plate and screw into the bores 73, 74 respectively.

The extension 41 of the punch housing 8 is formed with an inclined bore 80 (FIGS. 3 and 4) in which is secured by a set screw 84 one limb 81 of an angled leaf spring 82, the other limb 83 of which lies freely in a longitudinal groove 83a in the wall of the bore 42 of the punch-housing extension 41. The limb 83 protrudes slightly into the bore 42 so as to hold an insert in position in the bore, as will be explained later herein.

The operation of the above press tool is illustrated in FIGS. 3 and 4. At 87 in these figures there is shown part of a sheet into which self-piercing inserts are to be punched by means of the press tool in co-operation with a die 85 arranged co-axially with the tool on the opposite side of the sheet. FIG. 4 shows the position of the tool when an insert has been punched into the sheet, as shown at 86', and the punch 1 is at the bottom of its operative stroke. Prior to the operation of the tool the parts thereof occupy the positions shown in FIG. 3. It is assumed that, in a manner to be described later herein, an insert 86 has been fed into the bore 42 of the punch-housing extension 41 and is held therein in the position shown in FIG. 3 by the leaf spring 82. In each operation of the press tool, first the whole tool is moved downwards until two staking teeth formed on the bottom face 88 of the punch-housing extension 41 (one of the teeth can be seen at 89 in FIG. 3) contact the upper face of the sheet 87. The downward movement of the tool is brought about by the downward stroke of the ram of the press (not shown) acting on the head stock 28, which is clamped to the ram. The ram continues to move downwardly and, since the descent of the punch housing is stopped by the sheet 87, the spring 33 is compressed by the continued descent of the block 25. This continued descent also moves the punch 1 downwardly in the punch housing. During the downward movement of the punch a shoulder 91 on the punch engages a shoulder 92 on the pawl 12 and, for a purpose to be described later herein, rotates the pawl against the action of the spring 15 to the position shown in FIG. 4. The pawl is kept in this position by the body 3 of the punch as the punch continues to descend. During this continued descent the punching section 2 of the punch, in co-operation with the die 85, punches the insert 86 which is in the bore 42 of the punch-housing extension 41 into the sheet 87. During the latter part of the process of punching the insert into the sheet, a shoulder 94 at the bottom of the body 3 of the punch engages a shoulder 95 formed inside the punch housing by the top of the punch-housing extension 41 and presses the punch housing down to force the staking teeth 89 into the upper face of the sheet 87 so as to stake the insert 86 to the sheet.

The inserts are fed to the press tool in succession down the flight 70 and along the feed channel 43 in the ear 45 of the punch-housing extension 41. When the pawl 12 is in the position shown in FIGS. 3 and 5 it holds back the leading insert 93 in channel 43. When the pawl is displaced to the position shown in FIG. 4 during the downward movement of the punch 1, it allows the leading insert 93 to move forward to a position between the foot of the pawl and the feed aperture 40 in the wall of the bore 42 in the punch-housing extension 41.

After the insertion and staking of an insert in the sheet 87, the ram of the press is retracted upwardly. The first effect of this retraction is to raise the punch 1 in the punch housing, which remains in contact with the sheet 87 under the action of the spring 33. During the upward movement of the punch the body 3 thereof releases the pawl 12, which is immediately returned by the spring 15 to the position shown in FIGS. 3 and 5. As the pawl springs back to this position, the foot of the pawl propels the leading insert 93 in the feed channel 43 through the feed aperture 40 into the bore 42 in the punch-housing extension 41, where it is held by the leaf spring 82. The spring holds the insert in an upright position in the bore and prevents it tilting. The punch continues to rise in the puch housing until the lower end of the groove 4 in the punch abuts the key 9 attached to the punch housing. The punch housing is then carried up with the punch to the original position shown in FIG. 3, and the tool is ready for the next operation. The sheet 87 can then be moved, for example, by means of an indexing device, to bring another part of the sheet below the tool to receive the next insert.

As the tool reciprocates up and down it takes the end of the flight 70 with it. In order that it can flex to follow the movements of the tool, the flight is composed of a lower channel member 70a of rectangular cross section which is covered by an inverted upper channel member 70b also of rectangular cross section, the sides of the upper channel member embracing those of the lower channel member. The two members are slidable longitudinally relative to one another and are held together by flexible bands 70c spaced at intervals along the flight.

What I claim is:

1. A press tool for successively punching a different one of a plurality of articles into a material, said tool comprising: a punch reciprocable in a bore in a housing; a feed aperture in the wall of said bore through which an article to be punched can be fed into the bore; means for conducting to the feed aperture a succession of articles to be punched; a feed member movable away from and towards the feed aperture for successively feeding the next article to be punched through the aperture in the bore, the feed member being arranged normally to hold back the next article to be fed into the bore and, when moved away from the feed aperture, to release the next article to be fed into the bore for movement into the path of movement of the feed member towards the feed aperture, and the feed member being arranged to be moved away from the feed aperture by the punch during the operative stroke thereof; and return means for moving the feed member towards the feed aperture during the return stroke of the punch so as to feed the next article to be punched through the feed aperture into the bore in the housing.

2. A press tool as claimed in claim 1, in which the return means for the feed member comprises a spring.

3. A press tool as claimed in claim 1, in which the feed member comprises a pawl pivotably attached to the wall of the housing.

4. A press tool as claimed in claim 3, in which the pawl is formed with a portion which protrudes into the bore in the housing and is engageable by a shoulder on the punch during the operative stroke of the punch so that the pawl is pivoted away from the feed aperture.

5. A press tool as claimed in claim 1, in which means are provided for holding an article in position in said bore for engagement by the punch during the operative stroke thereof.

6. A press tool as claimed in claim 5, in which the means for holding an article in position in said bore comprise a leaf spring supported in the wall of the bore so as to protrude into the bore and extending longitudinally of the bore.

7. A press tool as claimed in claim 1, wherein the punch projects from the housing for connection to the pressure-applying member of a press, and wherein a spring is arranged to act on the punch and the housing so as to urge the punch in the direction of its return stroke and the housing in the opposite direction, co-operable abutments being provided on the punch and the housing to limit the extent to which either of these two components can move relative to the other in the respective one of said directions.

8. A press tool as claimed in claim 1 for punching a succession of inserts into sheet material, wherein staking teeth are provided on the exterior of the housing at that end of the bore through which the inserts are punched into the sheet material, and wherein the punch and the housing have co-operable abutments whereby force supplied to the punch at the end of its operative stroke is transmitted to the housing so as to force the staking teeth into the sheet material.

9. A press tool as claimed in claim 1 in combination with means for continuously supplying a succession of articles to be punched to the means for conducting the articles to the feed aperture.

10. A combination as claimed in claim 9, wherein the press tool is arranged for reciprocatory movement as a whole between successive operations of the punch, and wherein the means for continuously supplying a succession of articles to be punched comprise a flight or chute connected at one end to the means for conducting the articles to the feed aperture by coupling means which are constructed to allow the tool to reciprocate relative to the flight or chute.

References Cited

UNITED STATES PATENTS

| 1,084,218 | 1/1914 | Mayo. |
| 1,991,138 | 2/1935 | Christie et al. |
| 3,108,368 | 10/1963 | Steward _____ 29—432 |

THOMAS H. EAGER, Primary Examiner

U.S. Cl. X.R,

29—211, 432